US009535259B2

(12) United States Patent
Yanagisawa et al.

(10) Patent No.: US 9,535,259 B2
(45) Date of Patent: Jan. 3, 2017

(54) OPTICAL UNIT AND METHOD FOR PRODUCING SAME

(71) Applicant: NIDEC SANKYO CORPORATION, Suwa-gun, Nagano (JP)

(72) Inventors: Kazuhiko Yanagisawa, Nagano (JP); Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 81 days.

(21) Appl. No.: 14/433,466

(22) PCT Filed: Aug. 21, 2013

(86) PCT No.: PCT/JP2013/072229
§ 371 (c)(1),
(2) Date: Apr. 3, 2015

(87) PCT Pub. No.: WO2014/054347
PCT Pub. Date: Apr. 10, 2014

(65) Prior Publication Data
US 2015/0277138 A1 Oct. 1, 2015

(30) Foreign Application Priority Data
Oct. 5, 2012 (JP) .................................. 2012-223448

(51) Int. Cl.
*G02B 27/64* (2006.01)
*G03B 5/00* (2006.01)
(Continued)

(52) U.S. Cl.
CPC ............. *G02B 27/646* (2013.01); *B23K 26/24* (2013.01); *B23K 26/32* (2013.01); *G03B 5/00* (2013.01);
(Continued)

(58) Field of Classification Search
None
See application file for complete search history.

(56) References Cited

U.S. PATENT DOCUMENTS

2010/0091120 A1* 4/2010 Nagata ................. G02B 27/646
348/208.4

FOREIGN PATENT DOCUMENTS

| JP | 2010002722 A | 1/2010 |
| JP | 2010096803 A | 4/2010 |

(Continued)

OTHER PUBLICATIONS

International Search Report corresponding to Application No. PCT/JP2013/072229; Date of Mailing: Nov. 26, 2013, with English translation.

*Primary Examiner* — Derek S Chapel
(74) *Attorney, Agent, or Firm* — Cantor Colburn LLP

(57) ABSTRACT

An optical unit may include a movable body holding an optical element; a fixed body surrounding the movable body; a plate-shaped spring member with a fixed body side connection part, a movable body side connection part, and an arm part which connects the fixed body side connection part with the movable body side connection part; and a drive mechanism to displace the movable body. The cover may be provided with a side plate part. The fixed body side connection part may include a frame part; and a plurality of protruded parts protruded from the frame part. The protruded parts may be separately provided from each other for every welding portion and an entire tip end side of the protruded part is formed as a melted part by welding.

20 Claims, 9 Drawing Sheets

(51) Int. Cl.
*H04M 1/02* (2006.01)
*H04N 5/225* (2006.01)
*B23K 26/24* (2014.01)
*B23K 26/32* (2014.01)

(52) U.S. Cl.
CPC ......... *H04M 1/0264* (2013.01); *H04N 5/2257* (2013.01); *B23K 2201/24* (2013.01); *B23K 2203/04* (2013.01); *G03B 2205/0015* (2013.01); *G03B 2205/0023* (2013.01); *G03B 2205/0069* (2013.01)

(56) References Cited

FOREIGN PATENT DOCUMENTS

| | | | |
|---|---|---|---|
| JP | 2010217575 A | 9/2010 | |
| JP | 2011102823 A | 5/2011 | |

* cited by examiner

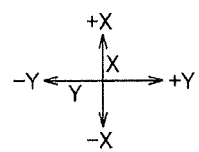
Fig. 6A
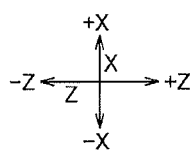
Fig. 6B
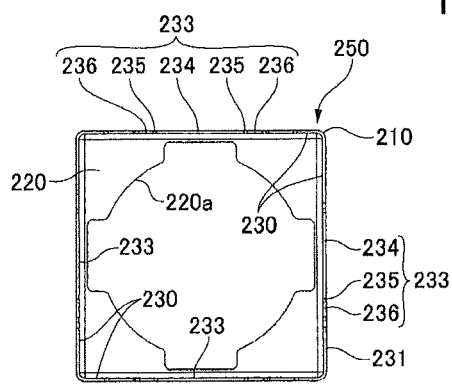
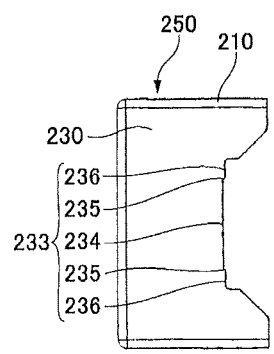
Fig. 6C
Fig. 6D
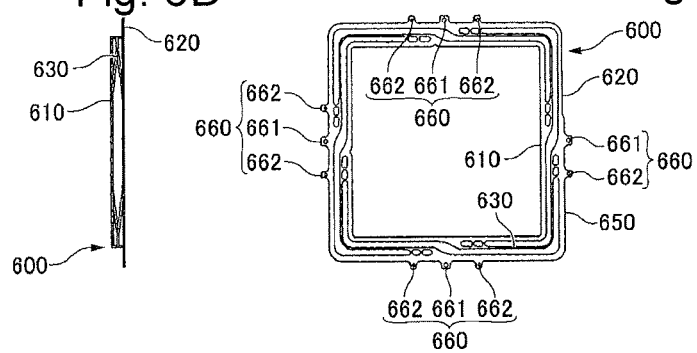
Fig. 6E
Fig. 6F
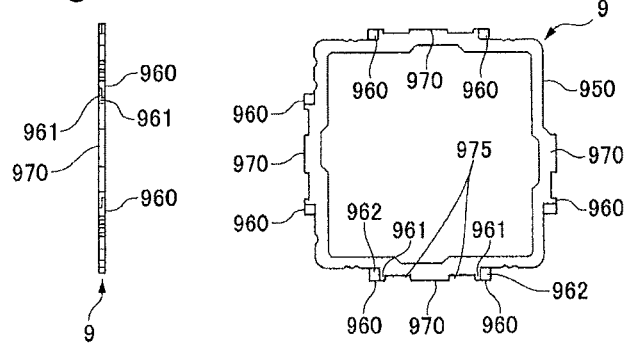

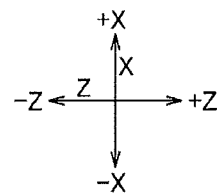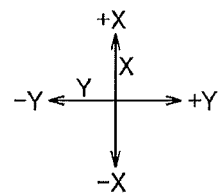
Fig. 8B          Fig. 8A
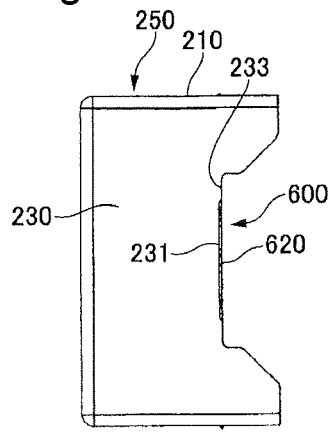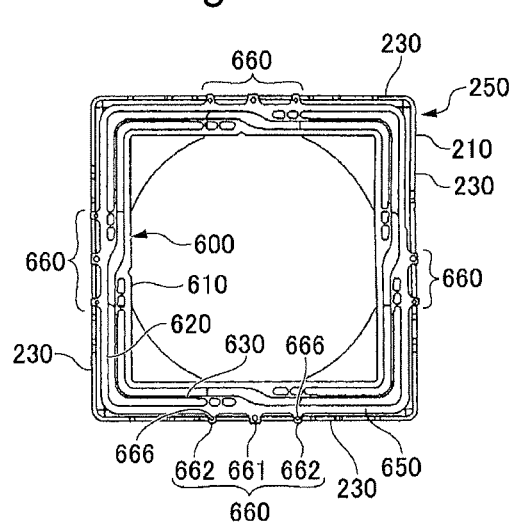
Fig. 8D          Fig. 8C
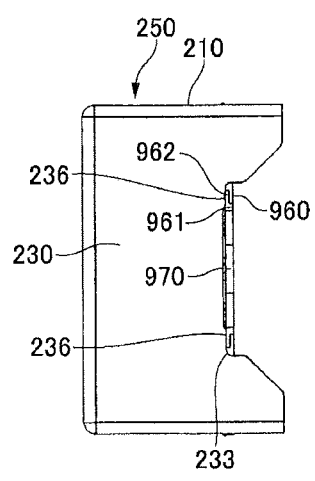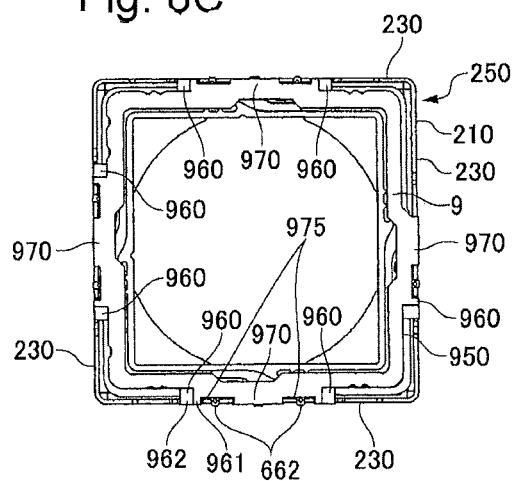

OPTICAL UNIT AND METHOD FOR PRODUCING SAME

CROSS REFERENCE TO RELATED APPLICATIONS

This is the U.S. national stage of application No. PCT/JP2013/072229 filed on Aug. 21, 2013. Priority under 35 U.S.C. §119(a) and 35 U.S.C. §365(b) is claimed from Japanese Application No. 2012-223448, filed Oct. 5, 2012 the disclosures of which are also incorporated herein by reference.

FIELD OF THE INVENTION

The present invention relates to an optical unit in which a movable body holding an optical element is supported by a fixed body through a spring member, and relates to a manufacturing method for the optical unit.

BACKGROUND

In recent years, a cell phone is structured as an optical device on which an optical unit for photographing is mounted. In the optical unit, in order to restrain disturbance of a photographed image due to a shake of hand of a user, a technique has been proposed in which a movable body provided with an optical element such as a lens is set in a supported state by a fixed body through a plate-shaped spring member and, when a shake is detected, the movable body is swung around a swing support point by a magnetic drive mechanism in a direction for correcting the shake (see Patent Literature 1).

PATENT LITERATURE

[PTL 1] Japanese Patent Laid-Open No. 2010-96803

In order to structure an optical unit having the above-mentioned structure, a fixed body side connection part of a plate-shaped spring member is required to be connected with a fixed body. For example, it is conceivable that, as shown in FIGS. 9A and 9B a protruded part 669 which is protruded toward an outer face side of a side plate part 230 of an upper cover 250 is previously provided in a fixed body side connection part 620 of a plate-shaped spring member 600 and then, a laser beam is irradiated to overlapped portions of both end parts 669a and 669b of the protruded part 669 with a rear side end face 231 in an optical axis direction of the side plate part 230 and thereby, the rear side end face 231 in the optical axis direction of the side plate part 230 is joined to both the end parts 669a and 669b of the protruded part 669 of the plate-shaped spring member 600.

However, in the structure shown in FIGS. 9A and 9B an unmelted portion of the protruded part 669 when the welding has been performed is largely protruded to an outer side from the side plate part 230 and thus an outside dimension of the optical unit is large. On the other hand, when a protruding dimension of the protruded part 669 from the fixed body side connection part 620 is reduced, it may be difficult to secure a welding portion due to a slight positional displacement when the plate-shaped spring member 600 is disposed. The structure shown in FIGS. 9A and 9B is a conceivable reference example and is not a prior art.

In view of the problems described above, at least an embodiment of the present invention is to provide an optical unit in which, even when a protruded part provided in the fixed body side connection part of the spring member is welded to a side plate part of a cover used in a fixed body, the protruded part is suppressed from protruding to an outer side from the side plate part, and provide a manufacturing method for the optical unit.

SUMMARY

To achieve the above, at least an embodiment of the present invention provides an optical unit including a movable body which holds an optical element, a fixed body which includes a cover made of metal and surrounding the movable body, a plate-shaped spring member made of metal which is provided with a fixed body side connection part connected with the fixed body, a movable body side connection part connected with the movable body, and an arm part which connects the fixed body side connection part with the movable body side connection part, and a drive mechanism configured to displace the movable body with respect to the fixed body, and the cover is provided with a side plate part which faces a side face of the movable body. The fixed body side connection part includes a frame part which is extended along a rear side end face in an optical axis direction of the side plate part, and a plurality of protruded parts which are protruded from the frame part toward an outer face side of the side plate part and are welded to the rear side end face in the optical axis direction at an overlapped portion with the rear side end face in the optical axis direction. The protruded parts are separately provided from each other for every welding portion and an entire tip end side of the protruded part is formed as a melted part by welding.

Further, to achieve the above, at least an embodiment of the present invention provides a manufacturing method for an optical unit, the optical unit including a movable body which holds an optical element, a fixed body which includes a cover made of metal and surrounding the movable body, a plate-shaped spring member made of metal which is provided with a fixed body side connection part connected with the fixed body, a movable body side connection part connected with the movable body, and an arm part which connects the fixed body side connection part with the movable body side connection part, and a drive mechanism configured to displace the movable body with respect to the fixed body, and the cover is provided with a side plate part which faces a side face of the movable body. The manufacturing method includes previously providing a plurality of protruded parts in the fixed body side connection part, the protruded part being protruded from a frame part extending along a rear side end face in an optical axis direction of the side plate part toward an outer face side of the side plate part so as to overlap with the rear side end face in the optical axis direction, the protruded parts being separately provided at positions to be welded, and a connecting step in which the fixed body side connection part and the fixed body are connected with each other. In the connecting step, a laser beam is irradiate to an overlapped portion of the rear side end face in the optical axis direction with the protruded part and thereby an entire tip end side of the protruded part is melted to weld the fixed body side connection part to the fixed body.

In at least an embodiment of the present invention, in order to connect the fixed body side connection part of the spring member with the cover of the fixed body, a protruded part protruding toward an outer face side of the side plate part of the cover is provided in the fixed body side connection part of the spring member, and an overlapped portion of the protruded part with the rear side end face in the optical axis direction of the side plate part is welded to each other. In at least an embodiment of the present invention, the protruded part is independently formed for every welding portion and the protruded part is small. Therefore, when welding is performed, the entire tip end side of the protruded part becomes a melted part by welding and thus the tip end side of the protruded part is not protruded to an outer side from the side plate part. In other words, when welding is performed, the entire tip end side of the protruded part becomes a melted part by welding and thus the melted part is slightly protruded to an outer side of the side plate part, or no melted part is protruded to an outer side of the side plate part. Therefore, an outside dimension of the optical unit can be reduced.

In at least an embodiment of the present invention, it is preferable that the cover is provided with a rectangular tube part having the side plate part at four positions corresponding to sides of a quadrangle, and the fixed body side connection part is provided with the two or more protruded parts for every side of the quadrangle. According to this structure, even when the protruded part is independently formed for every welding portion, the fixed body side connection part of the plate-shaped spring member and the side plate part of the cover can be firmly connected with each other.

In at least an embodiment of the present invention, it is preferable that, in the two or more protruded parts provided for every side, a dimension of the protruded part located on a center side of the side in an extended direction of the frame part is larger than a dimension of another protruded part in the extended direction of the frame part. According to this structure, the fixed body side connection part of the plate-shaped spring member and the side plate part of the cover can be firmly connected with each other.

In at least an embodiment of the present invention, it may be structured that the fixed body includes a bottom plate part which faces the movable body on a rear side in the optical axis direction, and a swing support point for swingably supporting the movable body is provided between the bottom plate part and the movable body, and the drive mechanism swings the movable body with the swing support point as a center. According to this structure, the movable body is swung so as to correct a shake of the optical unit and thereby inclination of the optical axis due to the shake can be corrected.

In at least an embodiment of the present invention, it is preferable that a first welding step is performed in which, in the two or more protruded parts provided for every side, in a state that one protruded part is pressed toward the rear side end face in the optical axis direction, a laser beam is irradiated to another protruded part, and a second welding step is performed in which a laser beam is irradiated to the one protruded part after the first welding step. According to this structure, welding can be surely and easily performed.

In at least an embodiment of the present invention, it is preferable that, in the second welding step, a plate-shaped stopper member for determining a movable range of the movable body to a rear side in the optical axis direction is overlapped with the protruded part on an opposite side to the side plate part, and the plate-shaped stopper member, the plate-shaped spring member and the side plate part are joined to each other by irradiation of the laser beam to the one protruded part. According to this structure, the plate-shaped stopper member is temporarily fixed to the cover successively following the step in which the plate-shaped spring member is connected with the cover.

In at least an embodiment of the present invention, it is preferable that the plurality of the protruded parts is formed with a recessed part which is visually observable from a rear side in the optical axis direction, and a laser beam is irradiated to the recessed part. According to this structure, based on a result that a position of the recessed part is recognized, a laser beam is irradiated to an accurate position.

In at least an embodiment of the present invention, it is preferable that the rear side end face in the optical axis direction is formed with a cut-out part which is recessed toward a front side in the optical axis direction at a portion overlapping with the melting part, and the protruded part is disposed on an inner side of the cut-out part. According to this structure, the fixed body side connection part is restricted from protruding from the rear side end face in the optical axis direction of the side plate part.

According to at least an embodiment of the present invention, in order to connect the fixed body side connection part of the spring member with the cover made of metal of the fixed body, a protruded part protruding toward an outer face side of the side plate part of the cover is provided in the fixed body side connection part of the spring member, and an overlapped portion of the protruded part with the rear side end face in the optical axis direction of the side plate part is welded to each other. The protruded part is independently formed for every welding portion and the protruded part is small. Therefore, when welding is performed, the entire tip end side of the protruded part becomes a melted part by welding and thus the tip end side of the protruded part is not protruded to an outer side from the side plate part. In other words, when welding is performed, the entire tip end side of the protruded part becomes a melted part by welding and thus the melted part is slightly protruded to an outer side of the side plate part, or no melted part is protruded to an outer side of the side plate part. Therefore, an outside dimension of the optical unit can be reduced.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIGS. 6A through 6F are explanatory views respectively showing an upper cover, a plate-shaped spring member and a plate-shaped stopper member which are used in an optical unit with a shake correction function in accordance with an embodiment of the present invention.

FIGS. 8A through 8D are explanatory views showing a fixing step of a plate-shaped spring member and a plate-shaped stopper member to an upper cover in an optical unit with a shake correction function in accordance with an embodiment of the present invention.

DESCRIPTION OF EMBODIMENTS

An embodiment of the present invention will be described below with reference to the accompanying drawings. In the following description, a structure for preventing a hand shake to a photographing unit will be described as an example for an optical unit. Further, in the following description, three directions perpendicular to each other are set to be an "X"-axis, a "Y"-axis and a "Z"-axis and a direction along an optical axis "L" (optical axis of lens) is set to be the "Z"-axis. Further, in the following description, regarding swings of the respective directions, turning around the "X"-axis corresponds to a so-called pitching (vertical swing), turning around the "Y"-axis corresponds to a so-called yawing (lateral swing), and turning around the "Z"-axis corresponds to a so-called rolling. Further, "+X" indicates one side of the "X"-axis, "−X" indicates the other side, "+Y" indicates one side of the "Y"-axis, "−Y" indicates the other side, "+Z" indicates one side (opposite side to an object side) of the "Z"-axis, and "−Z" indicates the other side (object side).

Entire Structure of Optical Unit

Figure 1:
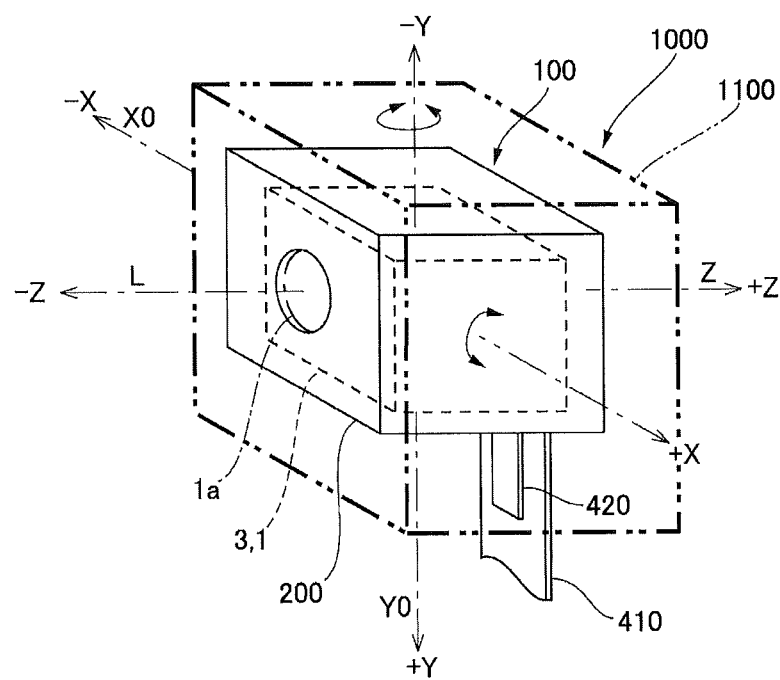
FIG. 1 is an explanatory view schematically showing a state that an optical unit with a shake correction function in accordance with an embodiment of the present invention is mounted on an optical device such as a cell phone.
Figure 2A:
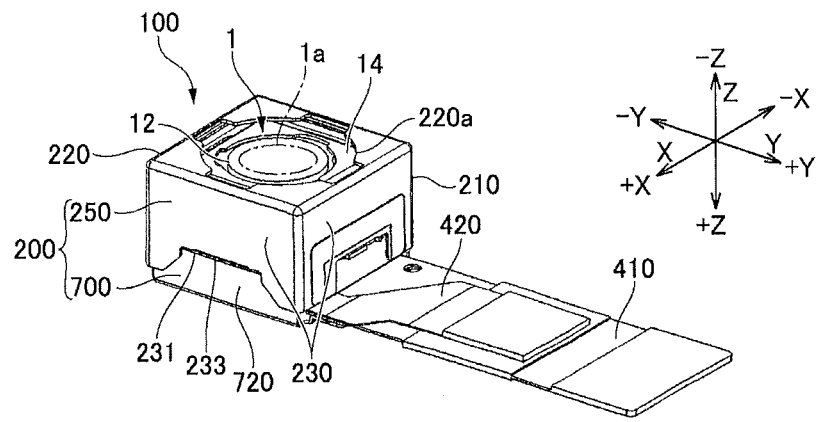
FIGS. 2A and 2B are explanatory views showing an optical unit with a shake correction function in accordance with an embodiment of the present invention.
Figure 2B:
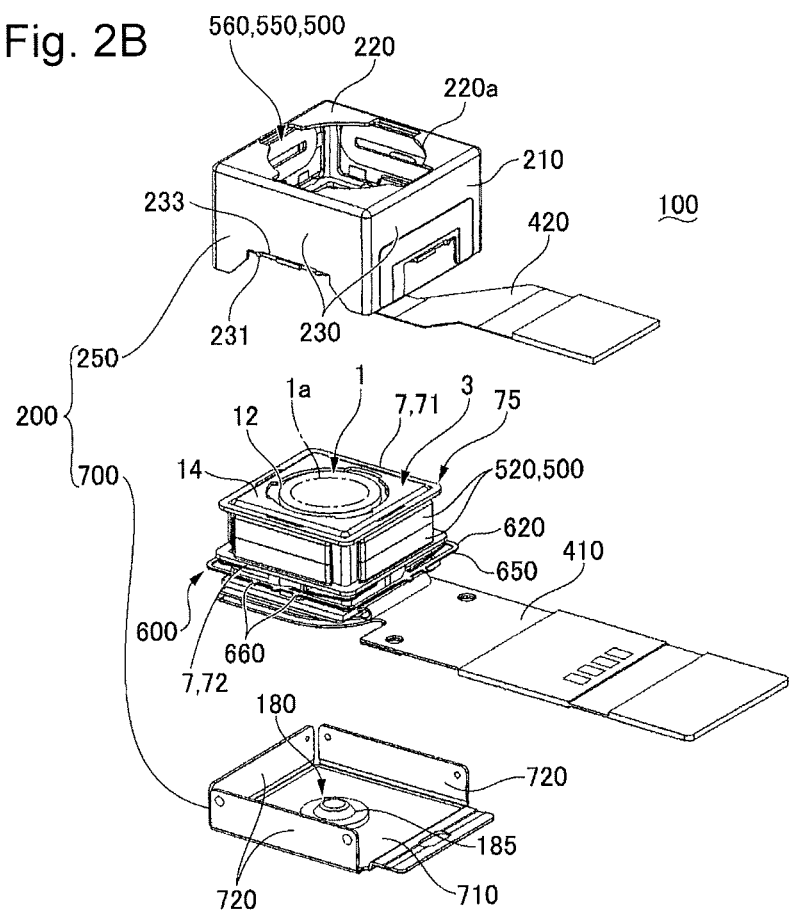
Figure 3:
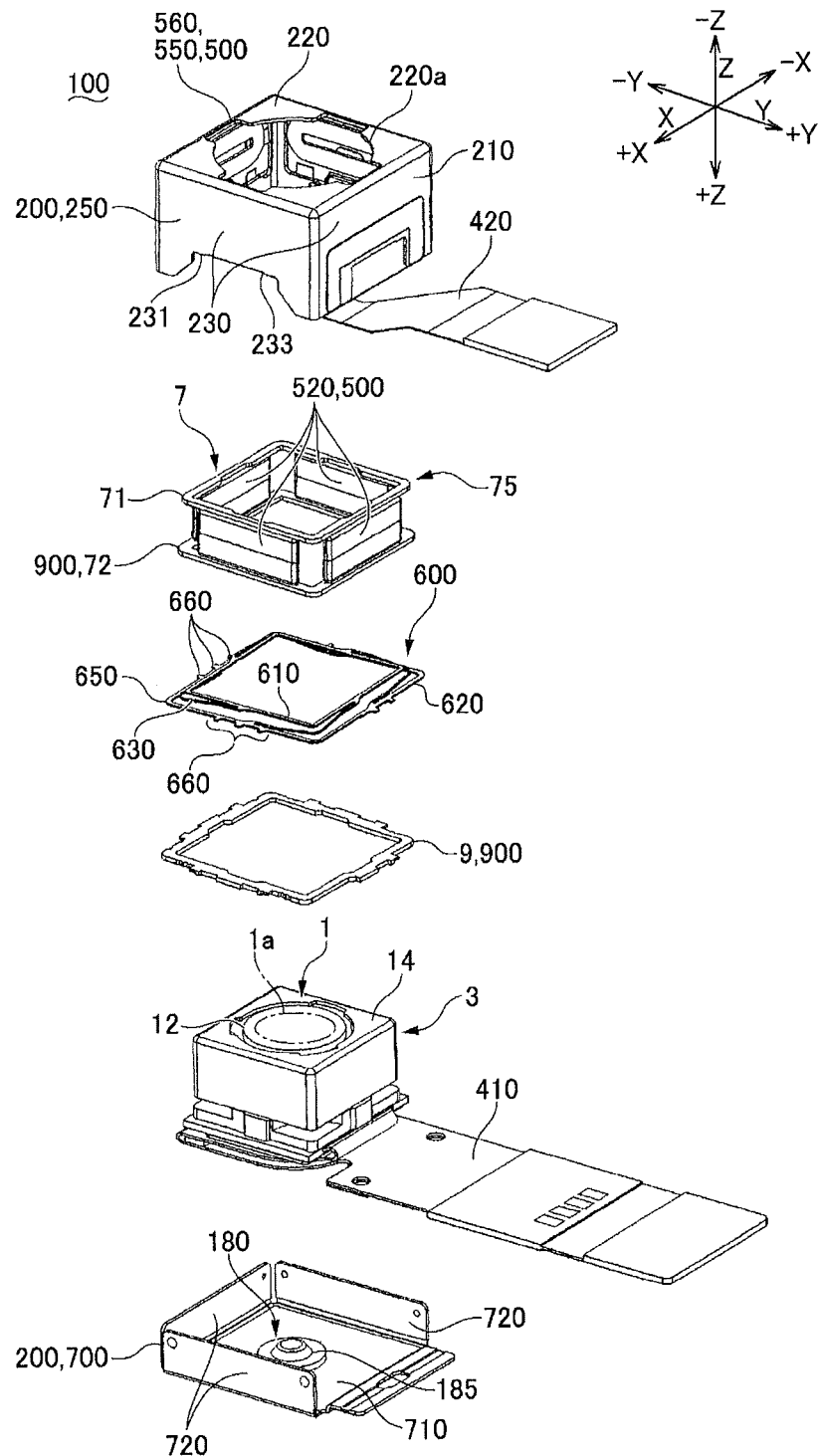
FIG. 3 is an exploded perspective view showing an optical unit with a shake correction function in accordance with an embodiment of the present invention which is exploded in detail.
Figure 4A:
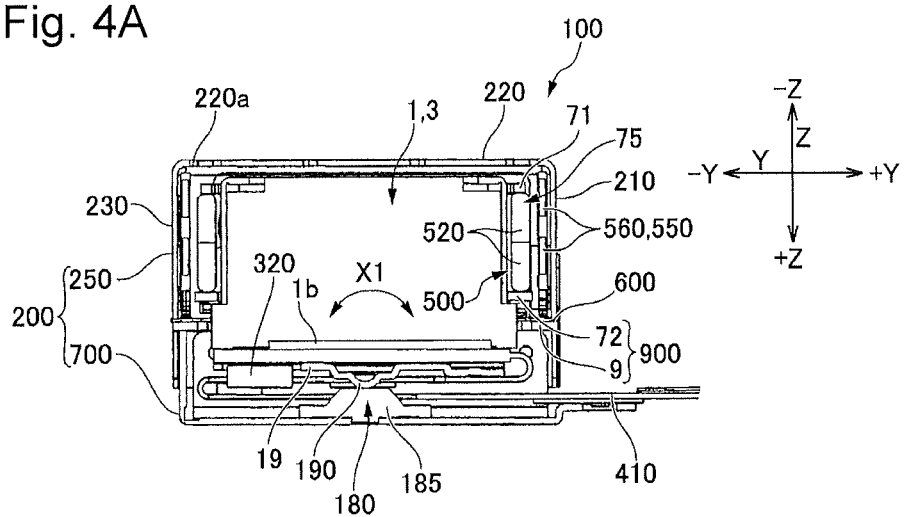
FIGS. 4A and 4B are cross-sectional views showing an optical unit with a shake correction function in accordance with an embodiment of the present invention.
Figure 4B:
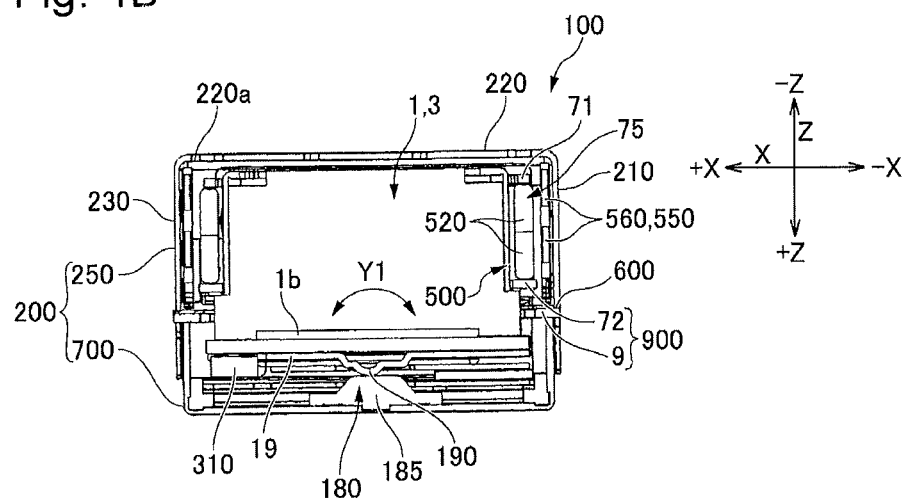

FIG. 1 is an explanatory view schematically showing a state in which an optical unit with a shake correction function in accordance with an embodiment of the present invention is mounted on an optical device such as a cell phone. FIGS. 2A and 2B are explanatory views showing an optical unit with a shake correction function in accordance with an embodiment of the present invention. FIG. 2A is a perspective view showing its outward appearance and the like and FIG. 2B is its exploded perspective view. FIG. 3 is an exploded perspective view showing an optical unit with a shake correction function in accordance with an embodiment of the present invention which is exploded in detail. FIGS. 4A and 4B are cross-sectional views showing an optical unit with a shake correction function in accordance with an embodiment of the present invention. FIG. 4A is a "YZ" cross-sectional view and FIG. 4B is an "XZ" cross-sectional view. In FIGS. 4A and 4B, a lens holder and the like disposed in an inside of a photographing unit are not shown.

An optical unit 100 (optical unit with a shake correction function/drive device) shown in FIG. 1 is a thin camera used in an optical device 1000 such as a cell phone with a camera and is mounted in a state supported by a chassis 1100 (device main body) of the optical device 1000. In the optical unit 100, when a shake such as a hand shake is occurred in the optical device 1000 at the time of photographing, disturbance occurs in a photographed image. Therefore, in the optical unit 100 in this embodiment, as described below, a movable body 3 including a photographing unit 1 is supported so as to be capable of being swung in an inside of a fixed body 200 and the optical unit 100 is provided with a shake correction drive mechanism (not shown in FIG. 1) which swings the movable body 3 on the basis of a detection result for a hand shake by a shake detection sensor such as a gyroscope (not shown) mounted on the optical unit 100 or a gyroscope (not shown) mounted on a main body side of the optical device 1000.

As shown in FIG. 1, FIGS. 2A and 2B, FIG. 3 and FIGS. 4A and 4B, flexible circuit boards 410 and 420 are extended from the optical unit 100 for supplying power to the photographing unit 1 and the shake correction drive mechanism 500 described below. The flexible circuit boards 410 and 420 are electrically connected with a host control section or the like which is provided in a main body of the optical device 1000. Further, the flexible circuit board 410 is also provided with a function for outputting a signal from the photographing unit 1. Therefore, the number of wiring lines in the flexible circuit board 410 is large and thus a relatively wide flexible circuit board 410 is used.

As shown in FIGS. 2A and 2B, FIG. 3 and FIGS. 4A and 4B, the photographing unit 1 includes a case 14 in a rectangular box shape which is made of a ferromagnetic plate such as a steel plate. An element holder which holds a holder 12 holding a lens 1a, a lens drive mechanism, an imaging element 1b (see FIGS. 4A and 4B) and the like is provided on an inner side of the case 14. An outer shape of the photographing unit 1 is determined by the case 14.

The optical unit 100 includes a fixed body 200, a movable body 3 provided with the photographing unit 1, a plate-shaped spring member 600 through which the movable body 3 is supported by the fixed body 200 so as to be capable of being displaced, and a shake correction drive mechanism 500 for generating a magnetic drive force between the movable body 3 and the fixed body 200 by which the movable body 3 is relatively displaced with respect to the fixed body 200.

The fixed body 200 is provided with an upper cover 250, a lower cover 700 and the like, and the upper cover 250 is provided with a rectangular tube part 210 which surrounds the photographing unit 1 and an end plate part 220 which closes an opening part on an object side of the rectangular tube part 210. The end plate part 220 is formed with a window 220a through which light from an object to be photographed is incident. In the upper cover 250, an end part on a rear side in the optical axis direction (opposite side to an object side/one side "+Z" in the "Z"-axis direction) of the rectangular tube part 210 is opened. The flexible circuit boards 410 and 420 are extended to an outer side through a rear side in the optical axis direction (one side "+Z" in the "Z"-axis direction) of the rectangular tube part 210 on the one side "+Y" in the "Y"-axis direction.

The lower cover 700 is a press-worked product which is made of a metal plate and the lower cover 700 is provided with a substantially rectangular bottom plate part 710 and three side plate parts 720 which are stood up from an outer circumferential edge of the bottom plate part 710 toward an object side. The side plate part 720 is not formed on the one side "+Y" in the "Y"-axis direction of the lower cover 700 for utilizing to lead out the flexible circuit board 410 to an outer side. A swing support point 180 described below is structured at a center position of the bottom plate part 710 of the lower cover 700.

Structure of Movable Body 3

In the optical unit 100 in this embodiment, the movable body 3 is structured of the photographing unit 1 and a rectangular frame shaped holder 7 surrounding an outer peripheral face of a case 14 of the photographing unit 1. The holder 7 is comprised of a first holder member 71 in a rectangular frame shape which is located on a front side in the optical axis direction and a second holder member 72 in a rectangular frame shape which is located on a rear side in the optical axis direction so as to face the first holder member 71. In this embodiment, flat plate-shaped permanent magnets 520 which are used in the shake correction drive mechanism 500 are held between the first holder member 71 and the second holder member 72. In other words, the first holder member 71 is fixed to front side faces in the optical axis direction of the permanent magnets 520 and the second holder member 72 is fixed to rear side faces in the optical axis direction of the permanent magnets 520. The permanent magnets 520, the first holder member 71 and the second holder member 72 structure a permanent magnet assembly 75 in a rectangular tube shape. Therefore, after the photographing unit 1 is inserted into an inner side of the rectangular tube-shaped permanent magnet assembly 75, an outer peripheral face of the case 14 of the photographing unit 1 and the inner peripheral face of the permanent magnet assembly 75 (inner faces of the permanent magnets 520) are fixed to each other by an adhesive or the like and, as a result, the permanent magnets 520, the first holder member 71, the second holder member 72, and the photographing unit 1 are integrated with each other to structure the movable body 3.

As specifically described below, the second holder member 72 faces the plate-shaped stopper member 9, which is fixed on an inner side of the rectangular tube part 210 of the upper cover 250, on a front side in the optical axis direction. The second holder member 72 structures a stopper mechanism 900 which determines a movable range to a rear side in the optical axis direction of the movable body 3 by interfering with the plate-shaped stopper member 9.

Structure of Plate-Shaped Spring Member 600

The plate-shaped spring member 600 is provided with a fixed body side connecting part 620 in a rectangular frame shape which is connected with the fixed body 200, a movable body side connecting part 610 which is connected with the movable body 3, and a plurality of arm parts 630 which are extended between the movable body side connecting part 610 and the fixed body side connecting part 620. Both ends of the arm part 630 are respectively connected with the movable body side connecting part 610 and the fixed body side connecting part 620. In this embodiment, as specifically described below, the fixed body side connection part 620 is provided with a rectangular frame part 650 and protruded parts 660 which are protruded toward outer sides from side portions of the frame part 650.

In order to connect the plate-shaped spring member 600 with the movable body 3 and the fixed body 200, in this embodiment, the movable body side connecting part 610 is fixed to a rear side end face in the optical axis direction of the second holder member 72 by a method such as welding. The fixed body side connection part 620 is, as described below, connected with a rear side end face 231 in the optical axis direction of the rectangular tube part 210 of the upper cover 250 (rear side end face 231 in the optical axis direction of the side plate part 230) by welding. The plate-shaped spring member 600 is made of metal such as SUS steel material and is formed by performing press working or etching processing using a photo lithography technique on a thin plate having a certain thickness. In this embodiment, a board thickness of the plate-shaped spring member 600 is 50-100 μm and, for example, 68 μm.

In this embodiment, when the movable body side connecting part 610 of the plate-shaped spring member 600 is connected with the movable body 3 and the fixed body side connecting part 620 is fixed to the fixed body 200, the movable body 3 is set in a pushed-up state to the front side in the optical axis direction by a swing support point 180 in the optical unit 100. Therefore, the movable body side connecting part 610 of the plate-shaped spring member 600 is set in a pushed-up state to the front side in the optical axis direction with respect to the fixed body side connecting part 620 and thus the arm parts 630 of the plate-shaped spring member 600 urge the movable body 3 to the rear side in the optical axis direction. Accordingly, the movable body 3 is set in an urged state toward the swing support point 180 by the plate-shaped spring member 600 and the movable body 3 is set in a supported state by the fixed body 200 so as to be capable of swinging through the swing support point 180.

Structure of Shake Correction Drive Mechanism 500

In the optical unit 100 in this embodiment, the shake correction drive mechanism 500 is structured of coil parts 560, the permanent magnets 520 which generate magnetic fields interlinking with the coil parts 560, and a flexible circuit board 420 for supplying power to the coil parts 560. More specifically, a flat plate-shaped permanent magnet 520 is fixed to each of four side faces of the case 14 in the movable body 3 and the coil part 560 is disposed on an inner face of the rectangular tube part 210 of the upper cover 250. The outer face side and the inner face side of the permanent magnet 520 are magnetized in different poles from each other. Further, the permanent magnet 520 is comprised of two magnet pieces which are disposed in the optical axis "L" direction and the faces of the magnet pieces facing the coil part 560 are magnetized in different poles from each other in the optical axis direction. Further, the coil part 560 is formed in a substantially quadrangular frame shape and its upper and lower long side portions are utilized as an effective side.

The permanent magnets 520 and the coil parts 560 which are disposed at two positions interposing the movable body 3 on both sides in the "Y"-axis direction structure a "Y"-side shake correction drive mechanism and, as shown by the arrow "X1" in FIG. 4A, the movable body 3 is swung with an axial line passing the swing support point 180 and extending in the "X"-axis direction as a swing center. Further, the permanent magnets 520 and the coil parts 560 which are disposed at two positions interposing the photographing unit 1 on both sides in the "X"-axis direction structure an "X"-side shake correction drive mechanism and, as shown by the arrow "Y1" in FIG. 4B, the movable body 3 is swung with an axial line passing the swing support point 180 and extending in the "Y"-axis direction as a swing center. In this embodiment, photo sensors 310 and 320 are provided at a rear side end part in the optical axis direction of the movable body 3 and inclination of the movable body 3 when the shake correction drive mechanism 500 is driven is detected to feed back to the shake correction drive mechanism 500.

In FIGS. 2A and 2B, FIG. 3 and FIGS. 4A and 4B, in this embodiment, in order to structure the shake correction drive mechanism 500, a sheet-shaped coil body 550 is used which is extended along the four inner faces of the upper cover 250. In the sheet-shaped coil body 550, four coil parts 560 are integrally formed with a predetermined interval. Further, when the sheet-shaped coil body 550 is developed, the sheet-shaped coil body 550 is provided with a shape extending in a belt shape and is fixed to the inner face of the upper cover 250 by a method such as surface bonding in a state that the sheet-shaped coil body 550 is bent so as to be along the four inner faces of the upper cover 250. A plurality of terminal parts is formed in the sheet-shaped coil body 550 with an electrically conducting layer extended from four coil parts 560. A flexible circuit board 420 is electrically connected with the terminal parts. Therefore, in comparison with a case that discrete air-core coils are used, a distance between the photographing unit 1 and the fixed body 200 can be narrowed and thus the size of the optical unit 100 can be made small.

Structure of Swing Support Point

On a rear side in the optical axis direction (one side "+Z" in the "Z"-axis direction) with respect to the photographing unit 1, the swing support point 180 which is a support point when the photographing unit 1 is swung is provided between the photographing unit 1 and a lower cover 700 of the fixed body 200. The photographing unit 1 is urged toward the lower cover 700 by the plate-shaped spring member 600 through the swing support point 180. In this embodiment, the swing support point 180 is formed of an elastic member 185 made of elastomer, which is fixed to a bottom plate part 710 of the lower cover 700, and a protruded part 190 formed in a support plate 19 which is provided at a rear side end part in the optical axis direction of the movable body 3. According to this structure, when an impact is applied to the movable body 3 toward a rear side in the optical axis direction, the impact is absorbed by the elastic member 185 and thus, the bottom plate part 710 of the lower cover 700 (fixed body 200) is not deformed. Further, unnecessary vibration applied to the movable body 3 during shake correcting control can be absorbed by the elastic member 185 and thus occurrence of resonance is prevented.

Structure of Stopper Mechanism 900

In the optical unit 100 with a shake correction function in this embodiment, a stopper mechanism 900 is structured which determines a movable range to a rear side in the optical axis direction of the movable body 3. More specifically, a plate-shaped stopper member 9 in a rectangular frame shape is fixed to an inner face of the rectangular tube part 210 of the upper cover 250 which is used in the fixed body 200. The plate-shaped stopper member 9 is located on a rear side in the optical axis direction with respect to the plate-shaped spring member 600. An outside dimension of the plate-shaped stopper member 9 is larger than an outside dimension of the second holder member 72. However, the outside dimension of the second holder member 72 is larger than an inside dimension of the plate-shaped stopper member 9. Therefore, the plate-shaped stopper member 9 faces the second holder member 72 on a rear side in the optical axis direction through the plate-shaped spring member 600. Further, the whole or substantially the whole of the arm part 630 of the plate-shaped spring member 600 is overlapped with the plate-shaped stopper member 9 in the optical axis direction. Further, the arm part 630 of the plate-shaped spring member 600 is overlapped with the second holder member 72 in the optical axis direction. Therefore, a part of the arm part 630 of the plate-shaped spring member 600 is overlapped with both of the second holder member 72 and the plate-shaped stopper member 9 in the optical axis direction.

In the stopper mechanism 900 structured as described above, when an impact is applied to the movable body 3 and thus the movable body 3 is displaced to a rear side in the optical axis direction while the elastic member 185 is deformed, displacement to the rear side in the optical axis direction of the movable body 3 is prevented by the plate-shaped stopper member 9. Therefore, a deformed range of the plate-shaped spring member 600 is limited and thus the plate-shaped spring member 600 is prevented from being plastically deformed and damaged. Further, when the movable body 3 is displaced to a rear side in the optical axis direction, the second holder member 72 and the plate-shaped stopper member 9 are abutted with each other through the plate-shaped spring member 600. Therefore, in order to structure the stopper mechanism 900, a structure is not required to adopt that the second holder member 72 and the plate-shaped stopper member 9 are abutted with each other while avoiding the plate-shaped spring member 600. Accordingly, a structure around the plate-shaped spring member 600 can be simplified. Further, when the movable body 3 is displaced to a rear side in the optical axis direction, the second holder member 72 and the plate-shaped stopper member 9 are abutted with each other through the arm parts 630 of the plate-shaped spring member 600. Therefore, when the stopper mechanism 900 is operated, the arm parts 630 are sandwiched and protected by the second holder member 72 and the plate-shaped stopper member 9 and thus the arm parts 630 are prevented from being plastically deformed.

In addition, the second holder member 72 and the plate-shaped stopper member 9 are provided in their entire peripheries around the optical axis and thus a large force does not concentrate on particular portions of the second holder member 72 and the plate-shaped stopper member 9. Therefore, the second holder member 72 and the plate-shaped stopper member 9 are hard to be damaged and, in addition, the movable body 3 can be prevented from being inclined largely to an opposite side to the abutting portion due to a reaction when the second holder member 72 and the plate-shaped stopper member 9 are abutted with each other. Accordingly, plastic deformation of the plate-shaped spring member 600 can be prevented surely.

Fixing Structure of Plate-Shaped Spring Member 600 and Plate-Shaped Stopper Member 9 to Upper Cover 250

Figures 5A, 5B, 5C:
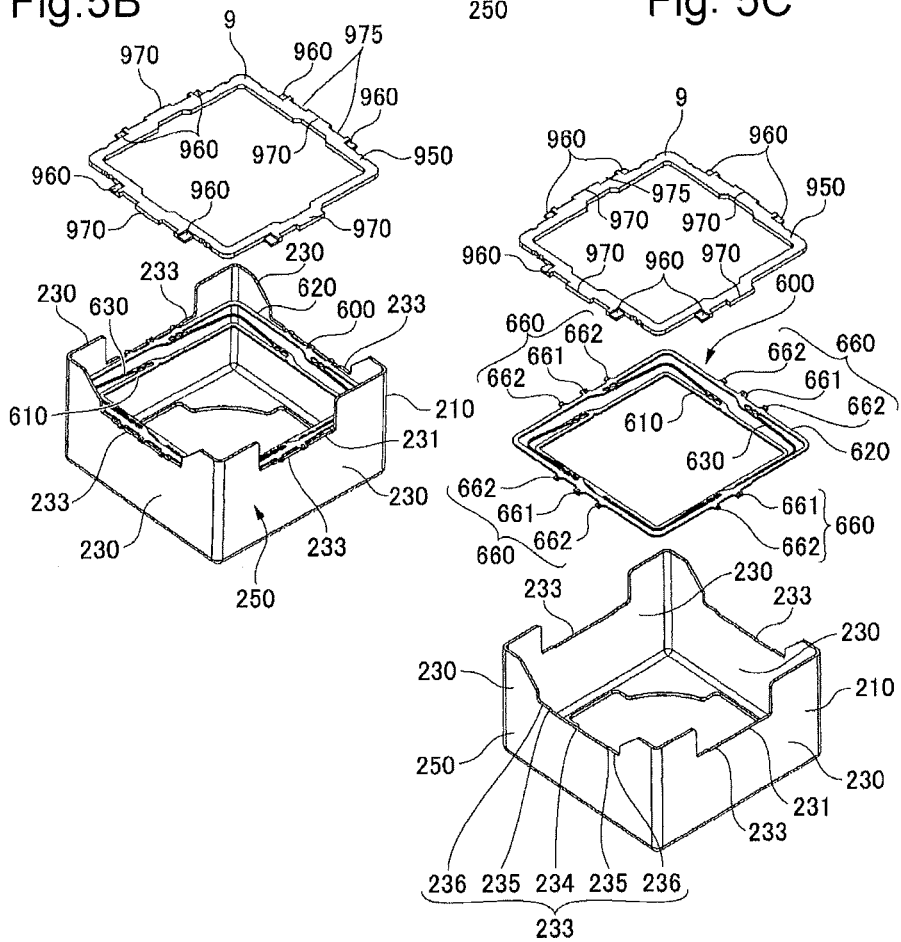
FIGS. 5A, 5B and 5C are explanatory views showing a fixing structure of a plate-shaped spring member and a plate-shaped stopper member to an upper cover in an optical unit with a shake correction function in accordance with an embodiment of the present invention which is obliquely viewed from a rear side in the optical axis direction.
Figure 7:
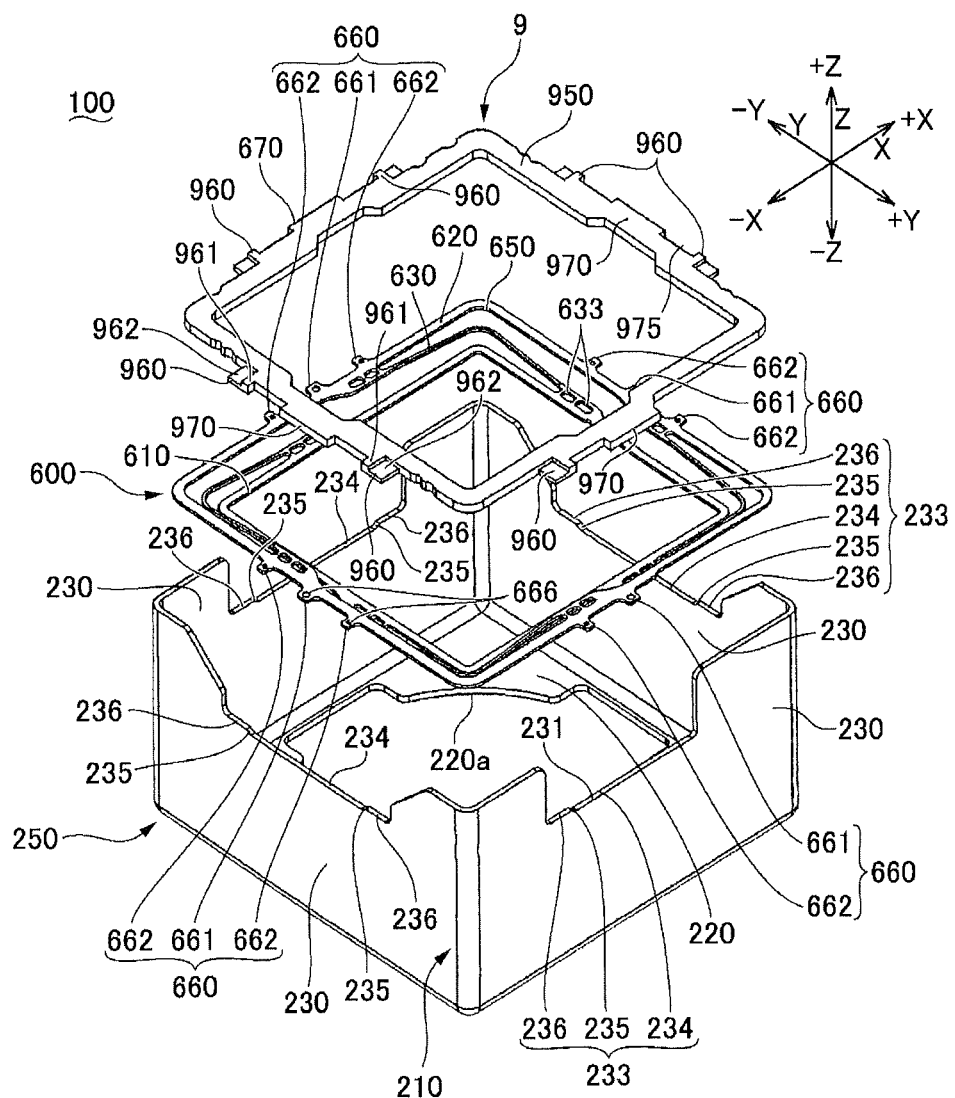
FIG. 7 is an exploded perspective view showing a positional relationship of an upper cover, a plate-shaped spring member and a plate-shaped stopper member in an optical unit with a shake correction function in accordance with an embodiment of the present invention.
Figure 9A:
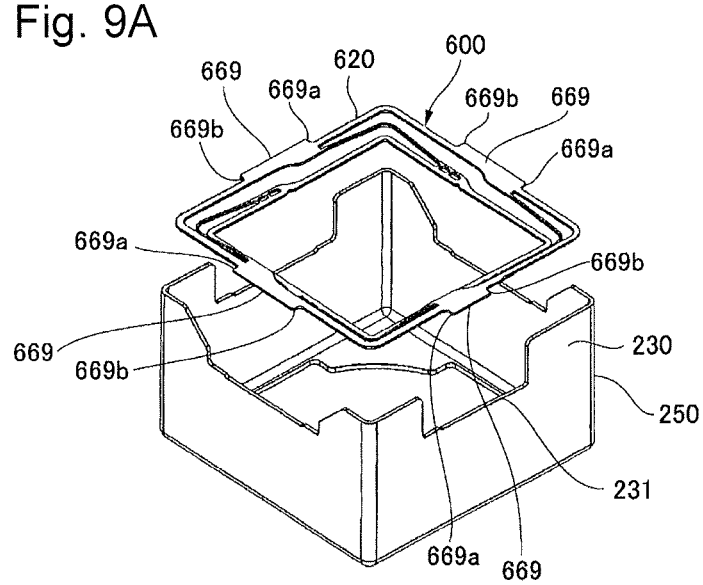
FIG. 9 is an explanatory view showing a reference example.
Figure 9B:
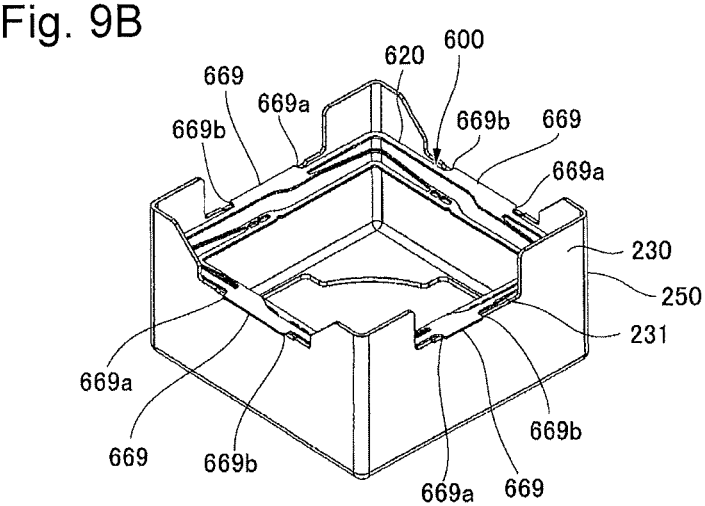

FIGS. 5A, 5B and 5C are explanatory views showing a fixing structure of the plate-shaped spring member 600 and the plate-shaped stopper member 9 to the upper cover 250 in the optical unit 100 with a shake correction function in accordance with an embodiment of the present invention which is obliquely viewed from a rear side in the optical axis direction. FIG. 5A is an explanatory view showing a state that the plate-shaped spring member 600 and the plate-shaped stopper member 9 are fixed to the upper cover 250, FIG. 5B is an explanatory view showing a state after the plate-shaped spring member 600 has been fixed to the upper cover 250 and before the plate-shaped stopper member 9 is fixed, and FIG. 5C is an explanatory view showing a state before the plate-shaped spring member 600 and the plate-shaped stopper member 9 are fixed to the upper cover 250. FIGS. 6A through 6F are explanatory views respectively showing the upper cover 250, the plate-shaped spring member 600 and the plate-shaped stopper member 9 which are used in the optical unit 100 with a shake correction function in accordance with an embodiment of the present invention. FIG. 6A is a bottom view showing the upper cover 250, FIG. 6B is a side view showing the upper cover 250, FIG. 6C is a bottom view showing the plate-shaped spring member 600, FIG. 6D is a side view showing the plate-shaped spring member 600, FIG. 6E is a bottom view showing the plate-shaped stopper member 9, and FIG. 6F is a side view showing the plate-shaped stopper member 9. FIG. 7 is an exploded perspective view showing a positional relationship and the like of the upper cover 250, the plate-shaped spring member 600 and the plate-shaped stopper member 9 in the optical unit 100 with a shake correction function in accordance with an embodiment of the present invention. The shapes of the respective members are shown in states before being welded in FIGS. 5A through 7. Further, in FIGS. 5A through 7, the movable body side connection part 610 is shown in a deformed state so that the movable body side connection part 610 is located on a front side in the optical axis direction with respect to the fixed body side connection part 620 in a state that the plate-shaped spring member 600 is assembled into the optical unit 100.

As shown in FIGS. 5A, 5B and 5C, FIGS. 6A through 6F and FIG. 7, in the optical unit 100 in this embodiment, the upper cover 250 is provided with a rectangular tube part 210 whose four side plate parts 230 are connected with each other in a circumferential direction. The fixed body side connection part 620 of the plate-shaped spring member 600 and the plate-shaped stopper member 9 are fixed to a rear side end face 231 in the optical axis direction of the side plate part 230 by laser welding. The upper cover 250 is produced by press working to a metal plate such as SUS steel material. A plate thickness of the side plate part 230 is, for example, about 100-150 µm, for example, 110 µm.

In this embodiment, a cut-out part 233 which is recessed to a front side in the optical axis direction is formed in the rear side end face 231 in the optical axis direction of the side plate part 230. The cut-out part 233 is provided with a bottom part 234 located on the most front side in the optical axis direction (the other side "−Z" in the "Z"-axis direction) at a center portion in a side direction, and intermediate parts 236 connected with the bottom part 234 through step parts 235 on both sides of the bottom part 234. The intermediate part 236 is located on a slightly rear side in the optical axis direction with respect to the bottom part 234. In the four side plate parts 230, the side plate part 230 located on the one side "+Y" in the "Y"-axis direction is formed with the step part 235 and the intermediate part 236 only on one side of the bottom part 234. In this embodiment, the bottom part 234 is used for welding to the fixed body side connection part 620 of the plate-shaped spring member 600, and the intermediate part 236 is used for welding to the plate-shaped stopper member 9.

Detailed Structure of Plate-Shaped Spring Member 600

In this embodiment, the fixed body side connection part 620 of the plate-shaped spring member 600 is provided with a rectangular frame part 650 and a plurality of protruded parts 660 which are protruded toward outer sides from side portions of the frame part 650. An outside dimension of the frame part 650 is smaller than an inside dimension of the rectangular tube part 210. However, the protruded part 660 is slightly protruded to an outer side with respect to the side plate part 230. When viewed in the optical axis direction, the protruded part 660 is overlapped with a portion corresponding to the bottom part 234 of the rear side end face 231 in the optical axis direction of the side plate part 230 so that the respective plate thickness directions are perpendicular to each other. According to this structure, the protruded part 660 and the rear side end face 231 in the optical axis direction of the side plate part 230 can be surely overlapped with each other. In this embodiment, the protruded part 660 is formed at two or more positions in each of sides of the rectangular frame part 650. More specifically, in four sides of the frame part 650, the side located on the one side "+Y" in the "Y"-axis direction is formed with two protruded parts 660 and the other three sides are formed with three protruded parts 660.

In this embodiment, the protruded part 660 is welded to the bottom part 234 of the rear side end face 231 in the optical axis direction of the side plate part 230. The protruded parts 660 are separated from each other. In other words, the protruded part 660 is independently formed at a position to be welded and a dimension (width dimension) in a side direction (extending direction of the frame part 650) of the protruded part 660 is small. In this embodiment, among the two or more protruded parts 660 formed in each of the sides, a dimension (width dimension) in the side direction (extending direction of the frame part 650) of the protruded part 661 located at a center side position of the side is larger than that of the protruded part 662 formed at an end side position of the side with respect to the protruded part 661.

A portion of the protruded part 660 overlapping with the rear side end face 231 in the optical axis direction of the side plate part 230 is formed with a circular recessed part 666 which is recessed toward a front side in the optical axis direction. The recessed part 666 is capable of being visually observed from a rear side in the optical axis direction and, when welding is to be performed, a laser beam is irradiated with the recessed part 666 as a reference. The frame part 650 of the fixed body side connection part 620 and the arm part 630 are connected with each other near the center in an extended direction of the frame part 650. A plurality of holes 633 is formed in the frame part 650 of the fixed body side connection part 620 near a root portion of the arm part 630. The hole 633 is utilized for adjustment of a spring constant. In other words, when a laser beam is irradiated to near the root portion of the arm part 630 so as to connect the holes 633 with each other, a dimension of the arm part 630 is changed and thus the spring constant can be adjusted.

Detailed Structure of Plate-Shaped Stopper Member 9

In this embodiment, the plate-shaped stopper member 9 is provided with a rectangular frame part 950 and a plurality of protruded parts 960 which are protruded toward an outer side at positions shifted to end sides from the center of a side portion of the frame part 950. An outside dimension of the frame part 950 is smaller than an inside dimension of the rectangular tube part 210. However, the protruded part 960 is protruded to a position overlapping with an outer face of the side plate part 230. Therefore, the outside dimension of the plate-shaped stopper member 9 including the protruded part 960 is the same as the outside dimension of the rectangular tube part 210. Accordingly, when viewed in the optical axis direction, the protruded part 960 is overlapped with a portion corresponding to the intermediate part 236 of the rear side end face 231 in the optical axis direction of the side plate part 230 so that their plate thickness directions are perpendicular to each other. The protruded part 960 is formed at one position on a side located on the one side "+Y" in the "Y"-axis direction of the frame part 950 and is formed at two positions on remaining three sides. In this embodiment, the side located on the one side "+Y" in the "Y"-axis direction of the frame part 950 is formed with only one protruded part 960. Therefore, a space for passing the flexible circuit board 420 shown in FIGS. 2A and 2B and the like is secured between the frame part 950 and the side plate part 230 on the one side "+Y" in the "Y"-axis direction.

In this embodiment, the protruded part 660 formed on the side located on the one side "+Y" in the "Y"-axis direction is welded at one position of an end part in its side direction with the rear side end face 231 in the optical axis direction of the side plate part 230 (rear side end face 231 in the optical axis direction of the intermediate part 236), and the protruded parts 660 formed on the three other sides are welded at two positions on both sides in the side direction with the rear side end face 231 in the optical axis direction of the side plate part 230 (rear side end face 231 in the optical axis direction of the intermediate part 236).

The protruded part 960 is, when viewed in the optical axis direction, provided with a first portion 961, which is overlapped with the rear side end face 231 in the optical axis direction without being welded to the side plate part 230, and a second portion 962 in a rectangular shape whose plate thickness is smaller than the first portion 961 and which is overlapped with the rear side end face 231 in the optical axis direction in an end part in its side direction. The second portion 962 is welded to the rear side end face 231 in the optical axis direction. In this embodiment, the plate thickness of the second portion 962 is ½-⅓ of the plate thickness of the first portion 961. For example, the plate thickness of the first portion 961 is 200 μm and the plate thickness of the second portion 962 is 80-100 μm. The plate-shaped stopper member 9 structured as described above is formed by etching to a metal plate such as SUS steel material and, in this case, the first portion 961 and the second portion 962 whose plate thicknesses are different from each other are formed by utilizing half etching. Therefore, the plate thickness of the second portion 962 is gradually reduced as separated from a side where the first portion 961 is located.

In this embodiment, a protruded part 970 similar to the protruded part 960 is formed at a center of a side portion of the frame part 950. However, thickness of the protruded part 970 is substantially equal to that of the first portion 961 of the protruded part 960. A cut-out part 975 is formed between the protruded part 960 and the protruded part 970, and the protruded part 662 of the plate-shaped spring member 600 is located in the cut-out part 975. Therefore, in a case that the protruded part 662 is welded as described below, even when swelling is occurred by a welded mark, the swelling is located in the cut-out part 975. Accordingly, when the plate-shaped stopper member 9 is disposed, the plate-shaped stopper member 9 is not floated from the upper cover 250.

Fixing Step of Plate-Shaped Spring Member 600 and Plate-Shaped Stopper Member 9 to Upper Cover 250

FIGS. 8A through 8D are explanatory views showing a fixing step of the plate-shaped spring member 600 and the plate-shaped stopper member 9 to the upper cover 250 in the optical unit 100 with a shake correction function in accordance with an embodiment of the present invention. FIG. 8A is a bottom view showing a state that the plate-shaped spring member 600 is fixed to the upper cover 250, FIG. 8B is a side view showing the state that the plate-shaped spring member 600 is fixed to the upper cover 250, FIG. 8C is a bottom view showing a state that the plate-shaped stopper member 9 is fixed to the upper cover 250, and FIG. 8D is a side view showing the state that the plate-shaped stopper member 9 is fixed to the upper cover 250. The shapes of the respective members before the respective members are welded are shown in FIGS. 8A through 8D. Further, in FIGS. 8A through 8D, the plate-shaped spring member 600 is shown in a deformed shape so that the movable body side connection part 610 is located on a front side in the optical axis direction with respect to the fixed body side connection part 620 in a state that the plate-shaped spring member 600 is assembled into the optical unit 100.

In a fixing step of the plate-shaped spring member 600 and the plate-shaped stopper member 9 to the upper cover 250 in a manufacturing step for an optical unit 100 in this embodiment, after the plate-shaped spring member 600 is fixed to the upper cover 250 in a spring member fixing step, the plate-shaped stopper member 9 is fixed to the upper cover 250 in a stopper member fixing step. These steps are performed after the coil parts 560 and the flexible circuit board 420 described with reference to FIGS. 2A and 2B are arranged in the upper cover 250 but, in FIGS. 5A, 5B and 5C and FIGS. 8A through 8D, these members are not shown. Further, after the movable body side connection part 610 of the plate-shaped spring member 600 is connected with the second holder member 72 provided in the movable body 3, the spring member fixing step and the stopper member fixing step are performed. However, in FIGS. 5A, 5B and 5C and FIGS. 8A through 8D, these members are not shown.

In the spring member fixing step, first, as shown in FIG. 5B and FIGS. 8A and 8B, the plate-shaped spring member 600 is disposed on an inner side of the upper cover 250 and then, the protruded parts 660 are overlapped with a portion corresponding to the bottom part 234 of the rear side end face 231 in the optical axis direction of the side plate part 230.

Next, in a first welding step of a spring member fixing step, the protruded part 661 of a plurality of the protruded parts 660 is pressed toward the rear side end face 231 in the optical axis direction of the side plate part 230 by a jig. As a result, other protruded parts 662 are abutted with the rear side end face 231 in the optical axis direction of the side plate part 230. In this state, the positions of the recessed parts 666 formed on the other protruded parts 662 are automatically detected and a laser beam is irradiated to the recessed part 666.

In this case, the protruded part 661 is independently formed from a portion to be welded and a dimension (width dimension) in a side direction (direction where the frame part 650 is extended) of the protruded part 660 is small. Therefore, the entire tip end side of the protruded part 662 becomes a melted part by welding. Further, the entire protruded part 662 becomes a melted part by welding. Therefore, the tip end side of the protruded part 662 is not protruded to an outer side from the side plate part 230. In other words, the entire tip end side of the protruded part 662 becomes a melted part by welding when the protruded part 662 is welded and thus, the melted part is set in a state that the melted part is slightly protruded to an outer side with respect to the side plate part 230 or the melted part is not protruded to an outer side with respect to the side plate part 230. In each case, the outside dimension of the optical unit 100 can be reduced in comparison with a case that a tip end part of the protruded part 660 is left without being melted.

Further, in a plurality of the protruded parts 660, one protruded part 661 is pressed toward the rear side end face 231 in the optical axis direction of the side plate part 230 by a jig and thereby other protruded parts 662 are abutted with the rear side end face 231 in the optical axis direction of the side plate part 230. Therefore, the rear side in the optical axis direction of the other protruded part 662 is opened in a state that the other protruded part 662 is abutted with the side plate part 230. Accordingly, a laser beam can be surely irradiated to the protruded part 662 from the rear side in the optical axis direction and thus welding can be surely and easily performed.

Further, the protruded part 660 is formed with the recessed part 666 which is visually observable from the rear side in the optical axis direction and thus, based on a result that the position of the recessed part 666 is recognized, a laser beam can be irradiated to an accurate position.

Next, in a second welding step of the spring member fixing step, as shown in FIG. 5A and FIGS. 8C and 8D, the plate-shaped stopper member 9 is put on a rear side in the optical axis direction of the plate-shaped spring member 600. As a result, when viewed in the optical axis direction, the protruded parts 960 and 970 of the plate-shaped stopper member 9 are overlapped with the rear side end face 231 in the optical axis direction of the side plate part 230. In this embodiment, the second portion 962 formed in the protruded part 960 of the plate-shaped stopper member 9 is overlapped with the rear side end face 231 in the optical axis direction of the side plate part 230 so as to abut with the rear side end face 231, and the protruded part 970 of the plate-shaped stopper member 9 is overlapped with the protruded part 661 of the plate-shaped spring member 600 so as to abut with the protruded part 661. Therefore, a laser beam is irradiated to an overlapped portion of the protruded part 970 of the plate-shaped stopper member 9 with the protruded part 661 of the plate-shaped spring member 600 in an oblique direction or in a lateral direction and thereby the protruded part 970 of the plate-shaped stopper member 9 and the protruded part 661 of the plate-shaped spring member 600 are welded to each other. In this case, the protruded part 970 of the plate-shaped stopper member 9 and the side plate part 230 of the upper cover 250 are welded to each other. Therefore, the plate-shaped stopper member 9 is temporarily fixed to the upper cover 250 successively following the step in which the plate-shaped spring member 600 is connected with the upper cover 250. In this case, the entire tip end side of the protruded part 661 serves as a melting part by welding and thus the tip end side of the protruded part 661 is not left in a projected state to an outer side from the side plate part 230.

Further, in the protruded part 660 provided in each of the sides, a dimension (width dimension) in an extended direction of the frame part 650 of the protruded part 661 located on a center side of the side is larger than a width dimension of the other protruded part 662. Therefore, the fixed body side connection part 620 of the plate-shaped spring member 600 and the side plate part 230 of the upper cover 250 can be connected firmly.

In addition, the fixed body side connection part 620 of the plate-shaped spring member 600 is provided with two or more protruded parts 660 for welding in the respective sides of a quadrangle. Therefore, even when the protruded part 660 is independently formed small in each of welding portions, the fixed body side connection part 620 of the plate-shaped spring member 600 and the side plate part 230 of the upper cover 250 can be firmly connected with each other.

Next, in a stopper member fixing step, a laser beam is irradiated to the second portion 962 formed in the protruded part 960 of the plate-shaped stopper member 9 and thereby the protruded part 960 of the plate-shaped stopper member 9 and the side plate part 230 are welded each other. In this case, the plate-shaped stopper member 9 is provided with the second portion 962, which has a smaller plate thickness than the first portion 961 and is overlapped with the rear side end face 231 in the optical axis direction, and welding is performed on the second portion 962. Therefore, even when both of the side plate part 230 and the plate-shaped stopper member 9 are melted, a range covered by a focal depth of the laser may be narrowed and thus, a laser output can be reduced. Accordingly, the welding portion can be melted appropriately. Therefore, scattering of melted material can be suppressed and thus contamination of the periphery and reduction of a melting part contributing to welding can be suppressed and increase of a bead can be suppressed. Further, scattering of melted material to the coil part 560 and the flexible circuit board 420 can be suppressed and thus occurrence of trouble due to scattered matters can be suppressed.

Further, plate thickness except the welding portion of the plate-shaped stopper member 9 can be increased. Therefore, the plate-shaped stopper member 9 can be secured with a sufficiently large strength as a stopper.

Other Embodiments

In the embodiment described above, the present invention is, as an example, applied to the optical unit 100 which is used in a cell phone with a camera. However, at least an embodiment of the present invention may be applied to the optical unit 100 which is used in a thin digital camera or the like. Further, in the embodiment described above, a lens drive mechanism and the like are structured in the photographing unit 1. However, at least an embodiment of the present invention may be applied to a fixed focus type optical unit in which the lens drive mechanism is not mounted on the photographing unit 1.

In addition, other than a cell phone, a digital camera and the like, the optical unit 100 with a shake correction function to which at least an embodiment of the present invention is applied may be fixed in an apparatus such as a refrigerator in which vibration is occurred in a certain interval and mounted so as to be capable of being remote controlled. According to the apparatus, a service can be provided in which information in the inside of the refrigerator is obtained at a visit place, for example, at the time of shopping. According to this service, the camera system is provided with an attitude stabilizing device and thus a stable image can be transmitted even when vibration may occur in the refrigerator. Further, this device may be fixed to a device such as a bag, a satchel or a cap of a child and a student which is carried at a time of commuting or attending school. In this case, states of surroundings are photographed at a constant interval and, when the image is transmitted to a predetermined server, the parent or the like watches the image at a remote place to secure security of the child. In this application, without conscious of a camera, a clear image is photographed even when vibration occurs at the time of moving. Further, when a GPS is mounted in addition to a camera module, the position of a target person can be obtained simultaneously and thus, when an accident occurs, its position and situation can be confirmed immediately. In addition, when the optical unit 100 with a shake correction function to which at least an embodiment of the present invention is applied is mounted at a position which is capable of photographing toward a front side in a car, it can be used as a drive recorder. Further, it may be structured that the optical unit 100 with a shake correction function to which at least an embodiment of the present invention is applied is mounted at a position which is capable of photographing toward a front side in a car and a front side image is photographed automatically at a constant interval and the image is automatically transmitted to a predetermined server. Further, when this image is distributed while interlocking with traffic jam information in the VICS (Vehicle Information and Communication System) of a car navigation system, the situation of a traffic jam can be provided further in detail. According to this service, similarly to a drive recorder mounted on a car, the situation when an accident has occurred can be recorded by a third person of passer-by without intention to utilize an inspection of the situation. Further, a clear image can be acquired without affected by vibration of a car. In a case of the application, when a power supply is turned on, a command signal is outputted to the control section and the shake control is started on the basis of the command signal.

Further, the optical unit 100 with a shake correction function to which at least an embodiment of the present invention is applied may be applied to shake correction of an optical device from which a light beam is emitted such as a laser beam pointer, a portable or on-vehicle projection display device and direct viewing type display device. Further, in an observation system with a high magnification such as an astronomical telescope system or a binocular system, the optical unit may be used to observe without using an auxiliary locking device such as three-legged supports. In addition, when at least an embodiment of the present invention is applied to a rifle or a turret of a tank, its attitude can be stabilized against vibration at the time of trigger and thus hitting accuracy can be enhanced.

In the embodiment described above, in order to weld two plate-shaped members used in the optical unit 100 (the side plate part 230 of the upper cover 250 (first plate-shaped member) and the plate-shaped stopper member 9 (second plate-shaped member)) to each other, thickness of a welding part (second portion 962) is reduced. However, it may be structured that, in a drive device such as a motor, when an end plate (second plate-shaped member) or the like is welded to an end face of a stator core (first plate-shaped member) which supports a coil, thickness of a welding part is reduced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. An optical unit comprising:
  a movable body which holds an optical element;
  a fixed body which comprises a cover made of metal and surrounding the movable body;
  a plate-shaped spring member made of metal which is provided with a fixed body side connection part connected with the fixed body, a movable body side connection part connected with the movable body, and an arm part which connects the fixed body side connection part with the movable body side connection part; and
  a drive mechanism structured to displace the movable body with respect to the fixed body;
  wherein the cover is provided with a side plate part which faces a side face of the movable body;
  wherein the fixed body side connection part comprises:
    a frame part which is extended along a rear side end face in an optical axis direction of the side plate part; and
    a plurality of protruded parts which are protruded from the frame part toward an outer face side of the side plate part and are welded to the rear side end face in the optical axis direction at an overlapped portion with the rear side end face in the optical axis direction; and
  wherein the protruded parts are separately provided from each other for every welding portion and an entire tip end side of the protruded part is formed as a melted part by welding.

2. The optical unit according to claim 1, wherein
  the cover is provided with a rectangular tube part having the side plate part at four positions corresponding to sides of a quadrangle, and
  the fixed body side connection part is provided with the two or more protruded parts for every side of the quadrangle.

3. The optical unit according to claim 2, wherein in the two or more protruded parts provided for every side, a dimension of the protruded part located on a center side of the side in an extended direction of the frame part is larger than a dimension of another protruded part in the extended direction of the frame part.

4. The optical unit according to claim 3, wherein
  the rear side end face in the optical axis direction is formed with a cut-out part which is recessed toward a front side in the optical axis direction at a portion overlapping with the melted part, and
  the protruded part is disposed on an inner side of the cut-out part.

5. The optical unit according to claim 3, further comprising:
  a bottom plate part of the fixed body which faces the movable body on a rear side in the optical axis direction; and
  a swing support point for swingably supporting the movable body between the bottom plate part and the movable body;
  wherein the drive mechanism swings the movable body with the swing support point as a center.

6. The optical unit according to claim 3, wherein
  the two or more protruded parts provided for every side are comprised of three protruded parts, and
  the other protruded parts are welded in an abutted state with the rear side end face in the optical axis direction by pressing the protruded part located on the center side of the side toward the rear side end face in the optical axis direction.

7. The optical unit according to claim 6, further comprising a plate-shaped stopper member configured to determine a movable range to a rear side in the optical axis direction of the movable body, the plate-shaped stopper member being disposed on the rear side in the optical axis direction with respect to the plate-shaped spring member, wherein the plate-shaped stopper member is provided with a rectangular frame part and a protruded part protruded toward an outer side from a side portion of the frame part, and wherein the protruded part of the plate-shaped stopper member is provided with a first portion, which is overlapped with the rear side end face in the optical axis direction without being welded to the side plate part, and a second portion having a smaller plate thickness than the first portion, the second portion being overlapped with the rear side end face in the optical axis direction and being welded to the rear side end face in the optical axis direction.

8. The optical unit according to claim 1, further comprising:

a bottom plate part of the fixed body which faces the movable body on a rear side in the optical axis direction; and a swing support point for swingably supporting the movable body between the bottom plate part and the movable body;

wherein the drive mechanism swings the movable body with the swing support point as a center.

9. The optical unit according to claim 1, wherein the rear side end face in the optical axis direction is formed with a cut-out part which is recessed toward a front side in the optical axis direction at a portion overlapping with the melted part, and the protruded part is disposed on an inner side of the cut-out part.

10. A manufacturing method for an optical unit comprising: a movable body which holds an optical element; a fixed body which comprises a cover made of metal and surrounding the movable body; a plate-shaped spring member made of metal which is provided with a fixed body side connection part connected with the fixed body, a movable body side connection part connected with the movable body, and an arm part which connects the fixed body side connection part with the movable body side connection part; and a drive mechanism configured to displace the movable body with respect to the fixed body; wherein the cover is provided with a side plate part which faces a side face of the movable body;

the manufacturing method comprising:

previously providing a plurality of protruded parts in the fixed body side connection part, the protruded part being protruded from a frame part extending along a rear side end face in an optical axis direction of the side plate part toward an outer face side of the side plate part so as to overlap with the rear side end face in the optical axis direction, the plurality of the protruded parts being separately provided at positions to be welded; and connecting the fixed body side connection part and the fixed body with each other;

wherein, a laser beam is irradiated to an overlapped portion of the rear side end face in the optical axis direction with the protruded part and thereby an entire tip end side of the protruded part is melted to weld the fixed body side connection part to the fixed body as a melted part.

11. The manufacturing method for an optical unit according to claim 10, wherein the cover is provided with a rectangular tube part having the side plate part at four positions corresponding to sides of a quadrangle, and the fixed body side connection part is provided with the two or more protruded parts for every side of the quadrangle.

12. The manufacturing method for an optical unit according to claim 11, wherein in the two or more protruded parts provided for every side, a dimension of the protruded part located on a center side of the side in an extended direction of the frame part is larger than a dimension of another protruded part in the extended direction of the frame part.

13. The manufacturing method for an optical unit according to claim 12, further comprising:

in the two or more protruded parts provided for every side, in a state that one protruded part is pressed toward the rear side end face in the optical axis direction, irradiating a laser beam to another protruded part; and irradiating a laser beam to the one protruded part after irradiating the laser beam to the another protruded part.

14. The manufacturing method for an optical unit according to claim 13, wherein a plate-shaped stopper member for determining a movable range of the movable body to a rear side in the optical axis direction is overlapped with the protruded part on an opposite side to the side plate part, and the plate-shaped stopper member, the plate-shaped spring member and the side plate part are joined to each other by irradiation of the laser beam to the one protruded part.

15. The manufacturing method for an optical unit according to claim 14, wherein the plurality of the protruded parts is formed with a recessed part which is visually observable from a rear side in the optical axis direction, and a laser beam is irradiated to the recessed part.

16. The manufacturing method for an optical unit according to claim 14, wherein the rear side end face in the optical axis direction is formed with a cut-out part which is recessed toward a front side in the optical axis direction at a portion overlapping with the melted part, and the protruded part is disposed on an inner side of the cut-out part.

17. The manufacturing method for an optical unit according to claim 14, wherein the plate-shaped stopper member is provided with a rectangular frame part and a protruded part protruded toward an outer side from a side portion of the frame part, the protruded part of the plate-shaped stopper member is provided with a first portion, which is overlapped with the rear side end face in the optical axis direction without being welded to the side plate part, and a second portion having a smaller plate thickness than the first portion, the second portion being overlapped with the rear side end face in the optical axis direction, and the second portion is welded to the rear side end face in the optical axis direction.

18. The manufacturing method for an optical unit according to claim 11, further comprising:

a first welding step in which, in the two or more protruded parts provided for every side, in a state that one protruded part is pressed toward the rear side end face in the optical axis direction, a laser beam is irradiated to another protruded part; and a second welding step in which a laser beam is irradiated to the one protruded part after the first welding step.

19. The manufacturing method for an optical unit according to claim 10, wherein the plurality of the protruded parts is formed with a recessed part which is visually observable from a rear side in the optical axis direction, and a laser beam is irradiated to the recessed part.

20. The manufacturing method for an optical unit according to claim 10, wherein the rear side end face in the optical axis direction is formed with a cut-out part which is recessed toward a front side in the optical axis direction at a portion overlapping with the melted part, and the protruded part is disposed on an inner side of the cut-out part.

\* \* \* \* \*